(12) United States Patent
Shaikh et al.

(10) Patent No.: US 8,111,626 B2
(45) Date of Patent: Feb. 7, 2012

(54) METHOD AND APPARATUS FOR PROVIDING STATISTICAL EVENT CORRELATION IN A NETWORK

(75) Inventors: Aman Shaikh, Summit, NJ (US); Cheng Ee, Rockaway, NJ (US); Ajay Mahimkar, Austin, TX (US); Jia Wang, Randolph, NJ (US); Jennifer Yates, Morristown, NJ (US); Yin Zhang, Austin, TX (US); Zihui Ge, Florham Park, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 508 days.

(21) Appl. No.: 12/347,444

(22) Filed: Dec. 31, 2008

(65) Prior Publication Data

US 2009/0262650 A1 Oct. 22, 2009

Related U.S. Application Data

(60) Provisional application No. 61/045,780, filed on Apr. 17, 2008.

(51) Int. Cl.
*H04L 12/26* (2006.01)
*G01R 31/08* (2006.01)
*H04J 1/16* (2006.01)

(52) U.S. Cl. ........................................................ 370/242
(58) Field of Classification Search ........................ None
See application file for complete search history.

(56) References Cited

U.S. PATENT DOCUMENTS

| 6,115,393 | A  | * | 9/2000  | Engel et al. | 370/469 |
| 7,428,300 | B1 | * | 9/2008  | Drew et al.  | 379/29.09 |
| 2007/0236336 | A1 | * | 10/2007 | Borcherding  | 340/10.34 |

\* cited by examiner

*Primary Examiner* — Chirag Shah
*Assistant Examiner* — Minh-Trang Nguyen

(57) ABSTRACT

A method and apparatus for providing event correlation in a network are disclosed. For example, the method extracts a plurality of events of interest from a database, and creates one or more event time series from the plurality of events of interest, wherein each of the one or more event time series comprises a set of events of a same type and of a same location that occur within a given time period. The method forms one or more composite events from the one or more event time series, and performs one or more pair-wise correlations for at least one of: the event time-series, or the one or more composite events. The method then identifies one or more pair-wise correlations that are statistically significant.

17 Claims, 4 Drawing Sheets

METHOD AND APPARATUS FOR PROVIDING STATISTICAL EVENT CORRELATION IN A NETWORK

This application claims the benefit of U.S. Provisional Application No. 61/045,780 filed on Apr. 17, 2008, which is herein incorporated by reference.

The present invention relates generally to communication networks and, more particularly, to a method and apparatus for providing event correlation in a network, e.g., a packet network, an Internet Protocol (IP) network, a Voice over Internet Protocol (VoIP), and the like.

BACKGROUND OF THE INVENTION

Businesses and consumers rely on their network service provider to provide a reliable communications infrastructure. For example, more and more businesses and consumers are relying on their Internet connections for much of their voice and data communications. However, from time to time, the network may suffer a network event that impacts the services provided to its customers, e.g., a failure or degradation of a network component. When such network event occurs, the network service provider is tasked with the responsibility for uncovering the source of the network event. In one example, the service provider may employ network personnel to analyze the detailed data associated with each event to identify the root cause. Unfortunately, a large service provider's network may experience thousands or possibly ten of thousands of network events for a given time period. As such, the process of identifying the source of all the network events is very labor intensive and may require some time before the source is properly identified.

Existing network management methods focus on the analysis of individual network events. This approach may be used for hard failures, e.g., link failures. However, some network events may have a short duration, where the symptoms of the network events may disappear by the time the network personnel can react to analyze them. For example, the network event may be a chronic network event with symptoms that keep re-appearing and disappearing. Generating alerts each time a symptom reappears creates too many alerts that may appear to be unrelated. Detecting and analyzing chronic network conditions is essentially performed by reviewing the data for multiple events reported at different times. This is a time-consuming, tedious and error-prone process. Furthermore, such process requires a significant amount of time before the source can be identified, thereby causing dissatisfaction for the customers and can potentially lead to a loss of business for the network service provider.

SUMMARY OF THE INVENTION

In one embodiment, the present invention discloses a method and apparatus for providing event correlation in a network, e.g. an IP network. For example, the method extracts a plurality of events of interest from a database, and creates one or more event time series from the plurality of events of interest, wherein each of the one or more event time series comprises a set of events of a same type and of a same location that occur within a given time period. The method forms one or more composite events from the one or more event time series, and performs one or more pair-wise correlations for at least one of: the event time-series, or the one or more composite events. The method then identifies one or more pair-wise correlations that are statistically significant.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing event correlation in a network such as an Internet Protocol (IP), an Internet Protocol (IP) Multimedia Subsystem (IMS) network, or a Voice over Internet Protocol (VoIP) network. Although the present invention is discussed below in the context of IP networks, the present invention is not so limited. Namely, the present invention can be applied for other networks such as the cellular networks, circuit switched networks, and the like.

Figure 1:
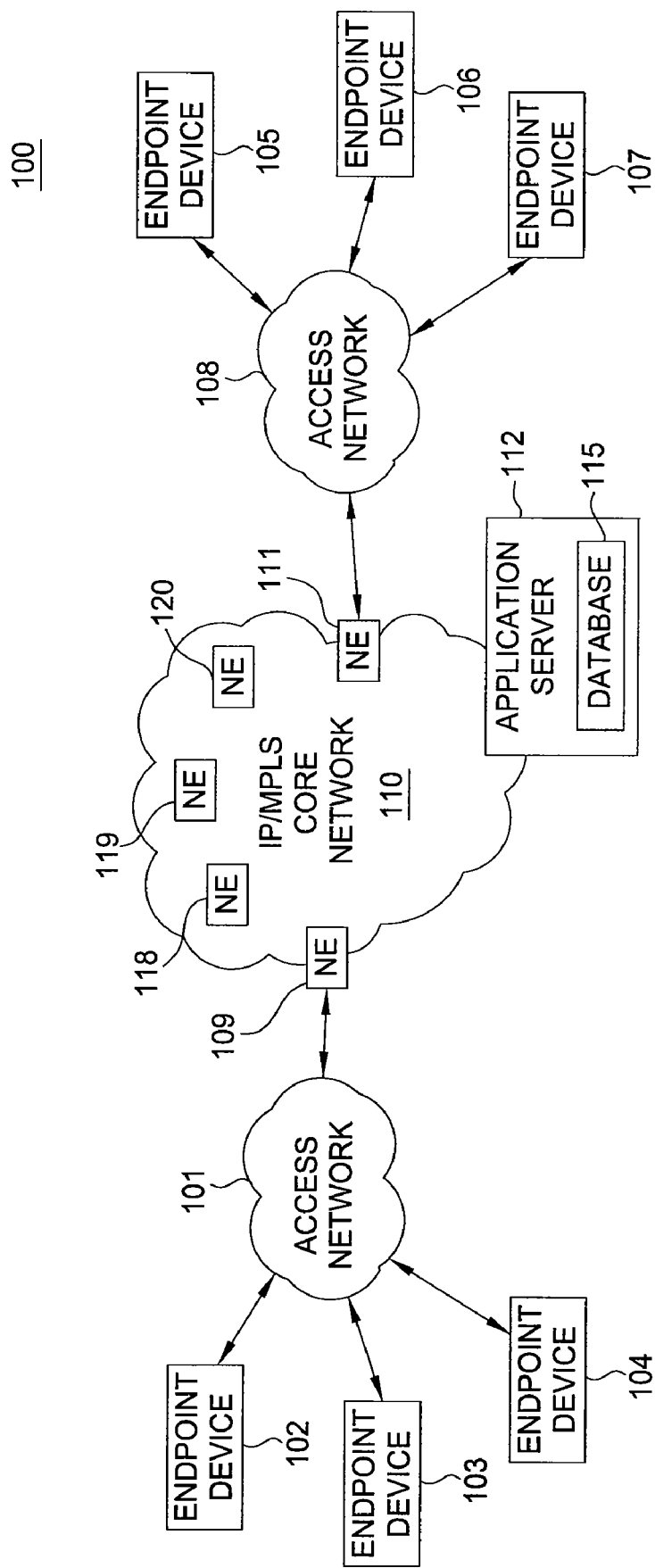
FIG. 1 illustrates an exemplary network related to the present invention.

FIG. 1 is a block diagram depicting an exemplary network 100 related to the current invention. Exemplary networks include Internet protocol (IP) networks, Ethernet networks, and the like. An IP network is broadly defined as a network that uses Internet Protocol such as IPv4 or IPv6 and the like to exchange data packets.

In one embodiment, the network 100 may comprise a plurality of endpoint devices 102-104 configured for communication with the core packet network 110 (e.g., an IP based core backbone network supported by a service provider) via an access network 101. Similarly, a plurality of endpoint devices 105-107 are configured for communication with the core packet network 110 via an access network 108. The network elements 109 and 111 may serve as gateway servers or edge routers for the network 110.

The endpoint devices 102-107 may comprise customer endpoint devices such as personal computers, laptop computers, Personal Digital Assistants (PDAs), servers, routers, and the like. The access networks 101 and 108 serve as a means to establish a connection between the endpoint devices 102-107 and the Network Elements (NEs) 109 and 111 of the IP/MPLS core network 110. The access networks 101 and 108 may each comprise a Digital Subscriber Line (DSL) network, a broadband cable access network, a Local Area Network (LAN), a Wireless Access Network (WAN), a $3^{rd}$ party network, and the like. The access networks 101 and 108 may be either directly connected to NEs 109 and 111 of the IP/MPLS core network 110, or indirectly through another network.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, a router, or like device. The IP/MPLS core network 110 also comprises an application server 112 that contains a database 115. The application server 112 may comprise any server or computer that is well known in the art, and the database 115 may be any type of electronic collection of data that is also well known in the art.

Those skilled in the art will realize that although only six endpoint devices, two access networks, five network elements and so on are depicted in FIG. 1, the communication system 100 may be expanded by including additional endpoint devices, access networks, network elements, and/or application servers, without altering the present invention.

The above IP network is described to provide an illustrative environment in which packets for voice, data and multimedia services are transmitted on networks. Businesses and consumers send and receive packets for various services over a network, e.g., an IP/MPLS network. Although the network service provider is expected to provide a reliable network, various network events may occur from time to time that will impact one or more services provided to the customers. Regardless of the cause of a network event, the customers expect timely remedies.

However, when a chronic network event occurs, the symptom may disappear and re-appear repeatedly. Chronic network events are problematic because network personnel may not get the opportunity to perform proper diagnosis and trouble isolation before the symptoms disappear. For example, the personnel may have to base their analysis on manually reviewing symptoms that appear around the same time to correlate the information across multiple events. This is a time-consuming, unpredictable, tedious and error-prone process.

In one embodiment, the present invention provides a method and apparatus for providing event correlation in a network. For example, the method first provides an infrastructure for performing pair-wise spatiotemporal statistical correlations. Spatiotemporal statistical correlations refer to correlations that track: the times at which one or more network events occur, and the spatial locations of the one or more network events. For example, one may be interested in correlating events on the same router occurring at the same time, such as CPU spikes and link down events associated with a common router. In one embodiment, the degree of correlation between different time series may be derived using standard statistical techniques.

In one embodiment, the infrastructure for performing pair-wise spatiotemporal statistical correlations comprises a common library for computing spatiotemporal pair-wise correlations that may be used by different applications. The infrastructure enables correlation across diverse sets of data sources collected from geographically dispersed locations. Specifically, the infrastructure provides a set of applications to enable detection and trouble-shooting of chronic network conditions by monitoring statistical correlations across multiple data sources, on a medium or long term basis.

Figure 2:
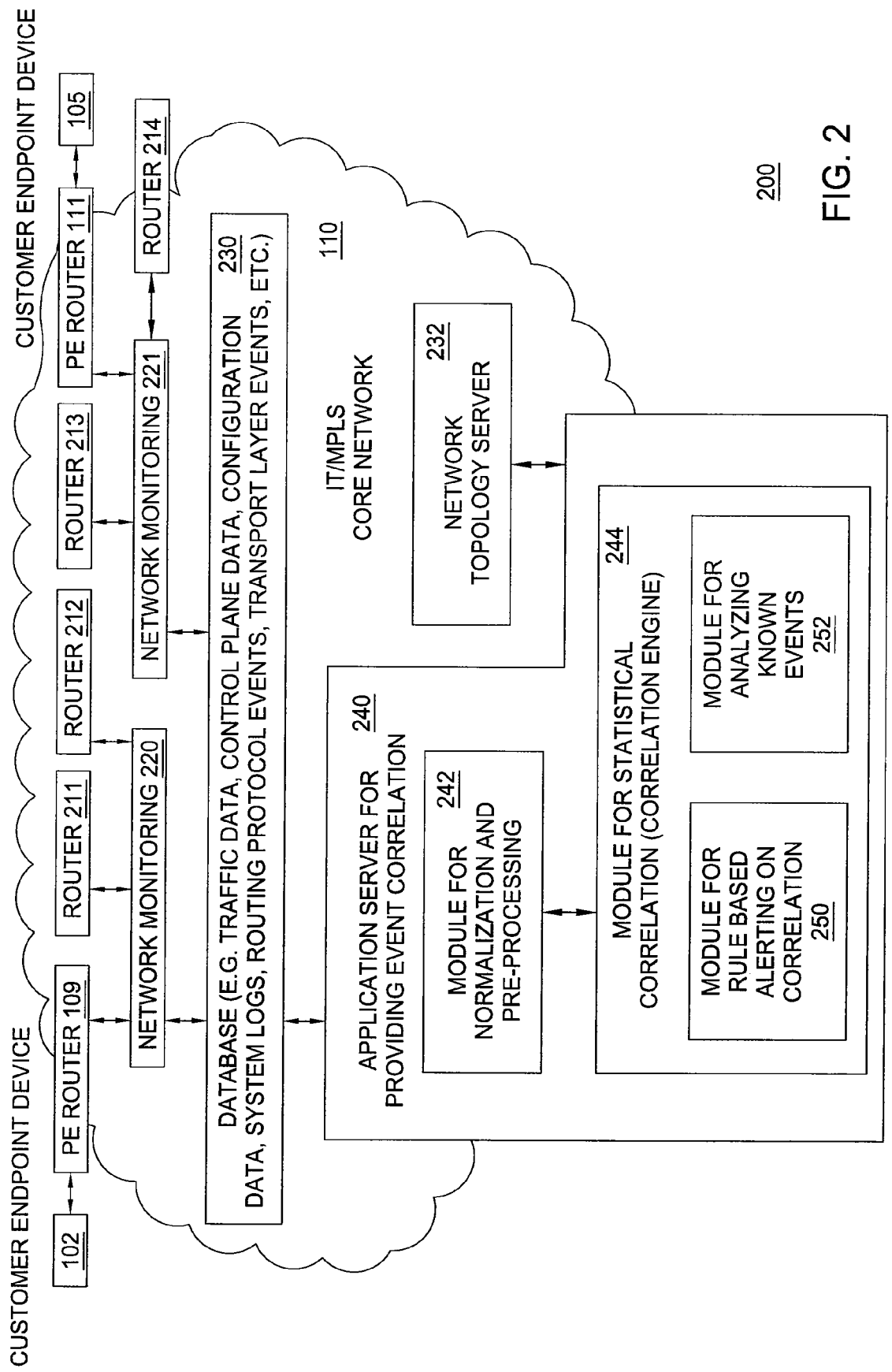
FIG. 2 illustrates an exemplary network with the current invention for providing event correlation in a network.

FIG. 2 illustrates an exemplary network 200 for providing event correlation in a network. For example, customer endpoint devices 102 and 105 are communicating with IP/MPLS core network 110 for accessing various network services, e.g., IP services.

In one embodiment, the IP/MPLS core network 110 comprises: PE routers 109 and 111, various other routers 211-214 used for routing packets through the network, network monitoring devices 220 and 221, a database 230, a network topology server 232, and an application server for providing event correlation 240. The customer endpoint device 102 communicates with the IP/MPLS core network 110 via the PE router 109, and the customer endpoint device 105 communicates with the IP/MPLS core network 110 via the PE router 111.

In one embodiment, the application server for providing event correlation 240 comprises: a module for normalization and preprocessing of data 242, and a module for statistical correlation 244 (e.g., a correlation engine). In one embodiment, the module for statistical correlation 244 comprises a module for implementing a rule based alerting on correlations 250, and a module for analyzing known events 252.

In one embodiment, the network monitoring devices 220 and 221 are used for gathering data from various routers 109,111, and 211-214. For example, traffic data, control plane data, configuration data, router system logs, workflow data (e.g., command history), end-to-end performance measurement data, routing protocol events (e.g., Open Shortest Path First (OSPF) events), network Layer-1 events, Simple network management protocol (SNMP) data (e.g., link utilization, memory, central processing unit), etc. may be gathered and stored in a database 230.

In one embodiment, the network topology server 232 is used for modeling network wide spatial and topological relationships across different network layers and localities. In one example, events on the same router may be related while events on routers several hops apart may not be related. In another example, a network Layer-1 event (e.g., a protection switching event on a synchronous optical network) and an IP layer link down event may not be correlated on the same link; however, the events could be correlated across different links sharing the same fiber, wherein one link is protected while the other link is not protected. Hence, the topology may be used to establish relationships across different network layers, localities, and so on.

In one embodiment, the module for normalization and preprocessing of data 242 is used to pre-process and normalize data obtained from the database 230 such that the collected data may be used by the correlation applications more effectively. For example, different monitoring devices and data collection tools may use different conventions for denoting time, naming critical network components, etc. For example, different data sources may specify time using different formats (unix timestamps, or different date/time formats) and using different time zones (GMT, local time etc). Routers may also be named differently, with some data sources using IP addresses, others using router names, while still others may incorporate domain name extensions. If the applications for performing event correlations need to track the different conventions used within each different data source, scalable correlation across a wide range of data sources may become computationally very expensive. Thus, for example, module 242 will normalize the time series following a common time zone (e.g., GMT), the date/time format, and also router/interface naming and addressing conventions.

In one embodiment, the module for statistical correlation 244 is used to provide a correlation engine for performing statistical spatiotemporal correlations on the preprocessed and normalized data. Specifically, the correlation engine has a pair-wise correlation capability. For example, given two time series and a specification defining a type of correlation to be performed, the pair-wise correlation capability may output a correlation score and a set of events that are joined. The correlation score may then quantify a correlation level for the two time series. In one embodiment, the module for statistical correlation 244 may be called by one or more other applications multiple times to provide scalability.

In one embodiment, the module 250 for rule based alerting on correlations is used to identify undesirable correlations, and use those undesirable correlations to detect chronic network events based on rules. For example, the rules are defined on pair-wise, statistical correlation metrics. Domain knowledge plays a key role in specifying these rules. That is, the rule-based alerting application of module 250 takes as input a user-specified list of pair-wise correlations, uses the correlation infrastructure, and validates each pair against a rule-set.

For example, using domain knowledge (e.g., topology), one may specify that a router reboot in one part of network should not correlate with protocol flaps on routers in another, geographically and topologically distinct part of network. The module 250 then generates alerts when the correlation-based rules are violated. For example, if the method detects that router reboots and protocol flaps are statistically correlated across very different parts of the network, the module may generate an alert. In one embodiment, the alerts that are generated may be designed to initiate further investigation, indicating that an undesirable condition has been detected in the network.

In one embodiment, the module for analyzing known events 252 is used to identify root causes for known events and to determine the impacts of known anomalous conditions. For example, the network may have a massive amount of event data available and processing through this data manually may not be feasible. In one embodiment, the module for analyzing known events 252 can be used to automate the troubleshooting process and to reduce the time required to process the network data to identify one or more patterns. For example, the method may perform an analysis of anomalous conditions by executing pair-wise correlation tests on a time-series of interest, against N other event time-series. Patterns that may not have been possible to detect manually may then be detected by executing these pair-wise correlation tests in an automated process.

In one embodiment, the network being monitored, e.g., IP/MPLS core network 110, may potentially have tens of thousands of interesting individual time series that the present method may create from the available data sources. Hence, even pair-wise correlations may turn the process into millions of correlations. One challenge in making the current method applicable for management of large networks is the scalability. Another challenge is the ability to detect and troubleshoot chronic network conditions. It has been observed that examining these time series manually is not feasible. Thus, the present method needs to be able to hone in on the correlations that matter within particular problem scopes. In one embodiment, the current method provides solutions for two applications: detection of chronic conditions, and troubleshooting known events.

For detecting chronic conditions, the present method may use a rules-based approach to identify statistical correlations of interest that one should alert. For example, the present method may discover undesirable patterns of behavior by validating observed correlations against pre-defined rules. For troubleshooting, the method may take the event series of interest (e.g., packet loss) and correlate it with "all other" time series to identify statistically correlated events. For example, given symptoms, the present method may identify all significant correlations that may be used in order to guide troubleshooting.

In one embodiment, the application server for providing event correlation first extracts events of interest from a database containing network-wide performance monitoring data. Each extracted event may then be identified using, e.g., the type of event, timestamp and location of the event (e.g., Label Distribution Protocol (LDP) flap (type) occurs at a New York router (location) at 10:00 AM on Oct. 1, 2007 (timestamp)). In one embodiment, an event series comprises of a set of events of the same type and location that occur within a given time period, e.g., specified by its beginning time and ending time.

In one embodiment, the events may then be further aggregated to form composite events. For example, event aggregation is supported along three dimensions: event type, time, and space. Specifically, aggregations over event types, temporal event aggregations, and spatial event aggregations may be performed.

In one embodiment, the current method provides two forms of composite events aggregated over event types. The composite events aggregated over event types are also simply referred to as composite event type hereafter. The first composite event type is created using logical operators such as AND, OR, and NOT. For example, for an event of type {A AND B} to occur, an event of type A and an event of type B must occur at the same time and location. The second composite event type is created using regular expressions that can be used to group related event types together. For example, a regular expression {OSPF_events} may be used to aggregate all the OSPF intra-domain events whose event types match the regular expression. These two forms of composite event types are sufficient for most network diagnosis tasks.

In one embodiment, temporal event aggregations may be used when an end user wishes to analyze how different events correlate at different time scales. In this case, it is useful to partition the input event series into separate time bins, to aggregate individual events inside each time bin together, and to perform correlation analysis on the aggregated event series. The end user may specify the size of time bins.

Spatial event aggregation may be used for network-wide event correlation. For example, it may be important to consider events with different spatial granularity. For example, the end user may want to understand both network-wide correlations and correlations specific to certain customer-facing interfaces. The end user may then specify the desired spatial granularity using atomic spatial attributes and/or spatial groups as described below.

In one embodiment, atomic spatial attributes represent the basic location of an event measurement. For example, the current method uses node, interface, link and path as the atomic spatial attributes. For example, measurements may include CPU events on a node, layer-1 events and link utilizations on a link, end-to-end loss on a path, and so on.

In one embodiment, spatial group is defined as a collection of atomic spatial attributes over which event aggregation is to be performed. The spatial group specifies the spatial granularity for event aggregation. For example, (i) OSPF area—aggregate events on nodes, links in the area, (ii) autonomous system (network)—aggregate events in multiple OSPF areas within the AS, (iii) vendor type—aggregate events on routers from the vendor.

In one embodiment, when correlating two event series, not only the two individual spatial components need to be specified, but also the spatial relationship between the two components. For example, the end user may be interested in correlating end-to-end path events (e.g., loss) with link events (e.g., congestion) occurring on links that belong (or do not belong) to the same path.

In one embodiment, the current method supports two classes of spatial relationship operators that specify such constraints on the relationship between different spatial components. The two classes of operators are neighborhood distance and selection as described below. The end user may also create new operators.

In one embodiment, neighborhood distance may be used to determine how far the two spatial components are from each other. For example, the distance between a node and another node is given by a number of hops. In one embodiment, the current method utilizes 1-hop, and 2-hop distances. When distance is equal to zero, it means correlation computation is being performed on the same spatial component (e.g., CPU/memory correlation on the same router, or IP/SONET correlation on the same link). When computing the distance between a link and an end-to-end path or a router and end-to-end path, the route calculations are used to see if the link or router belongs to the path (e.g., correlating link congestion with end-to-end loss, or router CPU with end-to-end loss).

In one embodiment, the selection operator is used to select (or exclude) certain spatial components from the spatial groups. For example, the operators may comprise "Some of" and "All but not some." As an example, the user might be interested in correlations on specific router vendor types. Another example is correlating internal Border Gateway Protocol (iBGP) events within a backbone network and eliminating all external Border Gateway Protocol (eBGP) events.

In one embodiment, the method may then receive a list of correlation rules from an end user. In one example, the end user may provide to the correlation engine a correlation rule such as to perform 1:N, M:N, and N² pair-wise correlations. Another example of a correlation rule is to correlate end-to-end loss within an OSPF area with high link congestion on an end-to-end path.

In one embodiment, the current method forms the event series for correlation e.g., by (i) retrieving all loss events within the OSPF area, and (ii) retrieving all congestion events only on links with zero neighborhood distance to the path (i.e. links that are part of the path). Note that routes are computed and stored in the database and are subsequently used to compute the neighborhood distance.

In one embodiment, the method may also receive an expectation parameter as a correlation rule, wherein the parameter specifies whether the user expects the correlation to be significant or insignificant. For example, the user may provide the input based on his/her domain knowledge. If specified, the current method may then validate the expectation and may also output any violations. If no expectation is specified, the goal of the user may then be to determine correlations.

In one embodiment, once the event data is aggregated as desired and correlation rules are received, the event data is processed for common time-series conversion. For example, the event data may originate from various sources with different time conventions, e.g., time-zones. The input data may then need to be processed for common time-series conversion prior to any correlation. Common time-series conversion refers to a process of handling data heterogeneity by mapping events to a common event time-series representation. The individual time-series may be either point events (zero event duration, e.g., IP link downs) or range events (e.g., either summarized over a measurement interval or event has a duration). The common time-series output is a binary time-series, wherein a value of "1" represents a time-window over which the event occurred and "0" represents otherwise.

In one embodiment, both time-series may have the same summarization interval. In that case, the correlation engine may be able to accept the data in a non-binary format. The current method is described the binary version but may be practiced using the same summarization intervals without a loss of generality.

In one embodiment, the binary time-series conversion occurs by first converting an event series (e.g., either point or range) to a range time-series. This may be accomplished by adding a correlation margin (e.g., time-window) to the start and end of the event time-value to capture the event delay propagation effect. For example, an IP link down may cause an OSPF, LDP protocols to timeout. Hence, when correlating the IP link down event and the protocol timeout event, a correlation margin of 30 seconds may be added. In one embodiment, the correlation margin is configurable and selected using domain knowledge.

In one embodiment, the current method then merges overlapping ranges while doing a spatiotemporal analysis. For example, there may be several overlapping ranges (because of events overlapping at different spatial components within a spatial group). An overlap occurs when the upper time-value of an event is more than lower time-value of a subsequent event.

In one embodiment, the method may then generate a binary time-series using a time-bin. For example, a default time may be set to 30 seconds. Then $$x(a(i)) = \begin{cases} 1, & \text{if } \exists a \in A \text{ covering } i \cdot \text{delta} \\ 0, & \text{otherwise} \end{cases},$$

where a is a range in range time-series A, delta is the time-bin size, $$0 \le i \le \frac{T}{\text{delta}},$$

T is the total trace duration for correlation.

One of the advantages of converting to a common binary time-series as described above is that the correlation engine may operate independent of underlying data characteristics (e.g., point versus range events or delay in event propagation). Note that the conversion to binary time-series may introduce different levels of auto-correlation depending on the choice of the time-bin size delta.

In one embodiment, the method then inputs the event time-series to a statistical correlation engine (described below) that performs pair-wise correlation and outputs those correlations that are considered statistically significant. For example, the statistical correlation engine refers to a computing device (hardware, software, etc.) for determining pair-wise statistical correlations, and for identifying significant correlations. The method uses a standard Pearson's product-moment correlation coefficient to compute the pair-wise correlations.

It should be noted that there are many other metrics for quantifying the correlation between two or more time-series. The current method uses the most classic and well-understood metric and only considers pair-wise correlation to better focus attention on addressing the challenges posed by the problem domain itself, namely, network diagnosis. However, any other metrics may be used without loss of generality.

A component of pair-wise correlation is the computation of the Pearson's coefficient of correlation. For two time-series x, y, the Pearson's coefficient of correlation is:

$$r = \frac{\sum_{i=1}^{N}(x_i - \mu_x)(y_i - \mu_y)}{(N-1)\sigma_x \sigma_y}$$

where, $x_i$, $y_i$ are individual samples in x and y, $\mu_x$, $\mu_y$ are means for x and y, $\sigma_x$, $\sigma_y$ are standard deviations of x and y, and N is the length of the time-series (sample size). The value of r falls within the closed interval [−1, 1] where −1 represents negative correlation, and +1 represents positive correlation.

In one embodiment, under the assumption that different samples within a time-series are independent, the method may then determine the significance of correlations. In one embodiment, the method may determine the significance of correlations using Fisher's z-transform:

$$z = \frac{1}{2}\ln\left[\frac{1+r}{1-r}\right],$$

where z is asymptotically Gaussian with mean $\mu_z=0$ and standard deviation $$\sigma_z = \frac{1}{\sqrt{N-3}}.$$

The significance of correlation may then be tested by computing a correlation score, defined as: score $$\Delta \frac{z - \mu_z}{\sigma_z} = z \times \sqrt{N-3}.$$

In one embodiment, the correlation score is considered to be significant if it falls outside a specific range. For example, in order to yield a false positive ratio e.g., of around 1%, a correlation score is significant if it falls outside of [−2.5, 2.5]. Equivalently, if z deviates from its mean (0) by more than 2.5 times the standard deviation ($\sigma_z$) then it is significant. With z asymptotically Gaussian, this yields around 1% false positive. In order to optimize accuracy, false positives and false negatives are limited. The descriptions of false positive and false negative are provided below.

Returning back to the discussion of false positives and false negatives, a false positive refers to the probability of misclassifying a relationship as a significant correlation when no such correlation exists and a false negative refers to the probability of misclassifying a relationship as no correlation when the correlation is actually significant.

Another approach for designing a test for the significance of correlation is the simple thresholding on r. Simple thresholding on r may be difficult for large networks where correlated data may be missed. For example, a threshold may be set on the absolute value of r a priori (e.g., requiring $|r| \geq 0.8$). However, many pairs whose correlations are significant both operationally (based on domain knowledge) and statistically may be missed with simple thresholding.

Another approach for designing a test for significance of a correlation is using the classic significance test. However, the classic significance test may not be applicable due to violation of its assumption. Specifically, the classic test assumes that samples within the same time-series are independent of one another. However, event time-series often show strong autocorrelation because (i) there is inherent serial dependency among different events, and (ii) the conversion to binary event time-series introduces autocorrelation when the time-bin size is smaller than the average event duration. Such autocorrelation makes the number of independent samples much smaller than the original sample size (N), thus increasing the standard deviation $\sigma_z$ and reducing the correlation score.

To overcome the difficulties of using the above tests for significance of a correlation, the current method provides significance tests that take into account autocorrelations. The correlation score $$\frac{z - \mu_z}{\sigma_z} = \frac{z}{\sigma_z}$$

is used to quantify the significance of the correlation coefficient. However, instead of setting $$\sigma_z = \frac{1}{\sqrt{N-3}}$$

as in an asymptotically Gaussian Fisher z transform, methods that take autocorrelation into account are used to compute $\sigma_z$.

The first test method that takes autocorrelation into account is referred to as the circular permutation test hereafter. The circular permutation test applies circular permutation to generate samples of z and uses them to estimate $\sigma_z$. This method accounts for autocorrelation at all lags.

In the circular permutation test, when a time series is shifted circularly, the autocorrelation structure within the time-series remains largely intact. Therefore, given two time-series x and y, random samples of r are generated by circularly shifting y (with different lags) and computing the correlation coefficient between x and shifted versions of y. The value of $\sigma_z$ is estimated from the corresponding z values. Specifically, for each lag $t \in [0, N]$, let r(t) be the Pearson's correlation coefficient between the x and the circularly shifted version of y at lag t. The Pearson's correlation coefficient is computed using $$r(t) = \frac{\sum_{i=1}^{N}(x_i - \mu_x)(y_{(i+t)ModN} - \mu_y)}{(N-1)\sigma_x\sigma_y}.$$

The Fisher z-transform with lag t is computed using $$z(t) = \frac{1}{2}\ln\left[\frac{1+r(t)}{1-r(t)}\right]. \text{ Let } \sigma_z^{perm} = stddev(\{z_i\})$$

be the standard deviation of $\{z(t)\}$. The correlation score is then computed as $$score_{perm} = \frac{z}{\sigma_z^{perm}} = \frac{z(0)}{stddev(\{z_t\})}.$$

The Fast Fourier Transform (FFT) is used to efficiently compute r(t) at all lags t.

The second test method that takes autocorrelation into account, computes $\sigma_z$ by replacing the sample size, N, by the effective sample size, Neff. This approach only accounts for lag-1 autocorrelation but is more efficient than the circular permutation test. The key idea in this second test is to replace the original sample size N with the effective sample size Neff, which estimates the number of independent samples. Taking into account the lag-1 autocorrelation, the effective sample size for correlation coefficient is given as $$N_{eff} = \begin{cases} N \times \dfrac{1 - r_{1,x} r_{1,y}}{1 + r_{1,x} r_{1,y}} & \text{if } r_{1,x}, r_{1,y} \text{ are both significant} \\ N & \text{otherwise} \end{cases}$$

where, $r_{1,x}$ and $r_{1,y}$ are the first-order (i.e., lag-1) autocorrelation coefficients of time-series x and y.

For example, at 5% significance level, $r_{1,x}$ (or $r_{1,y}$) is significant if it is above $$r_1(95\%) = \frac{-1 + 1.65\sqrt{N-2}}{N-1}.$$

The corresponding correlation score is $$score_{eff} = \frac{z}{\sigma_z^{eff}} = \frac{z}{1/\sqrt{N_{eff}-3}} = z \times \sqrt{N_{eff}-3}.$$

In one embodiment, the method may then interpret the above correlation results. However, the correlation results are based on data collected over a fixed time interval and by definition is incomplete. Thus, the method needs to take into account the presence of (i) missing measurement data (e.g., SNMP uses UDP and does not retransmit lost reports), and (ii) fluctuating event frequency across different correlation periods (e.g., due to non-stationary network behavior such as an unanticipated global event).

For example, if there are hundreds of events of a certain type per month, and then there is the occurrence of very few events of this type in a particular month, then this would affect the correlation. This does not necessarily indicate that there is a fundamental change in the correlation behavior. It may be more a function of reporting. Meanwhile, the changes in frequency of any individual time-series may itself be worth alarming. It is therefore important to make the method robust to missing data and fluctuating event frequency.

In order to determine the robustness of the current method to missing data and fluctuating event frequencies, the event data is tailored to a binary event time-series. Specifically, let x and y be two binary event time-series. Let $p_x$, $p_y$ and $p_{xy}$ be the fraction of 1's in x, y and x*y, where $x*y = \{x_i*y_i\}$ is the time-series formed by the element-wise product of x and y. The Pearson's correlation coefficient is computed using $$r = \frac{p_{xy} - p_x p_y}{\sqrt{p_x p_y (1 - p_x)(1 - p_y)}}.$$

To test the robustness of the method, the amount that r is affected by the difference between the $p_x$ and/or $p_y$ observed in a given correlation period compared to those observed in a typical correlation period is evaluated. This evaluation distinguishes the genuine values of r from artifacts caused by missing data and fluctuating event frequency.

To evaluate the robustness, the expected values of $p_x$ and $p_y$ in a normal correlation period is computed. These expected values may be obtained by estimating the data loss rate or computing the average/medium across multiple correlation periods. Let $\overline{p_x}$ and $\overline{p_y}$ denote the expected values of $p_x$ and $p_y$. In the current method, the effect that causes $p_x$ to deviate from $\overline{p_x}$ is assumed to be independent of the effect that causes $p_y$ to deviate from $\overline{p_y}$. Under this assumption, an estimate of the hypothetical correlation coefficient (when $p_x = \overline{p_x}$ and $p_y = \overline{p_y}$) is $$r_{hyp} = \frac{\dfrac{\overline{p_x}}{p_x}\dfrac{\overline{p_y}}{p_y}p_{xy} - \left(\dfrac{\overline{p_x}}{p_x}p_x\right)\left(\dfrac{\overline{p_y}}{p_y}p_y\right)}{\sqrt{\left(\dfrac{\overline{p_x}}{p_x}p_x\right)\left(\dfrac{\overline{p_y}}{p_y}p_y\right)\left(1 - \dfrac{\overline{p_x}}{p_x}p_x\right)\left(1 - \dfrac{\overline{p_y}}{p_y}p_y\right)}}$$

$$= \frac{\dfrac{\overline{p_x}}{p_x}\dfrac{\overline{p_y}}{p_y}p_{xy} - \overline{p_x}\,\overline{p_y}}{\sqrt{\overline{p_x}\,\overline{p_y}(1-\overline{p_x})(1-\overline{p_y})}}.$$

To determine if r is affected by differences in $p_x$ and/or $p_y$, the significance of the difference between $r_{hyp}$ and r may be tested. If the difference is significant, then the change in event frequency (due to missing data or non-stationary network behavior) has a significant impact on the observed correlation.

To illustrate, the robustness, suppose x and y experience constant data success rate of $s_x$ and $s_y$. Then, $$\frac{\overline{p_x}}{p_x} = \frac{1}{s_x} \text{ and } \frac{\overline{p_y}}{p_y} = \frac{1}{s_y}.$$

Consider the special case when both x and y are rare (that is, $p_x$ and $p_y$ are close to 0). In this case $$r = \frac{p_{xy} - p_x p_y}{\sqrt{p_x p_y (1 - p_x)(1 - p_y)}}$$

becomes $$r = \frac{p_{xy}}{\sqrt{p_x p_y}}.$$

When this is combined with $r_{hyp} = \dfrac{\dfrac{\overline{p_x}}{p_x}\dfrac{\overline{p_y}}{p_y}p_{xy} - \overline{p_x}\,\overline{p_y}}{\sqrt{\overline{p_x}\,\overline{p_y}(1-\overline{p_x})(1-\overline{p_y})}}$, $r_{hyp}$ simplifies to $$r_{hyp} = \frac{1}{s_x s_y} \frac{p_{xy}}{\sqrt{\left(\dfrac{p_x}{s_x}\right)\left(\dfrac{p_y}{s_y}\right)}} = \frac{r}{\sqrt{s_x s_y}}.$$

As a result, measurement data loss causes the observed r to decrease by a factor of $\sqrt{s_x s_y}$. Unless the loss rate is too high or the event frequency deviates from the expected frequency by too much, their relative impact on correlation is unlikely to be significant. As a result, $h_{hyp}$ may be tested when there is a high loss rate or an observed large change in event frequency in either of the two input time-series. Note that these scenarios may be worth alarming anyway.

In one embodiment, after interpreting the correlation results, the method may perform further analysis. For example, automated "drill-down" refers to an automated process for understanding correlation results by performing multiple layers of analysis (broadly a multi-layer analysis) wherein the first layer is a high level analysis, the second layer is a more detailed analysis than the first layer, the $3^{rd}$ layer is more detailed than the $2^{nd}$ layer, and so on. In one example, a drill-down analysis may be used to identify interesting patterns that may indicate problems in the network. In another example, new features of interest that are added to the network may be identified.

In one embodiment, the drill-down is performed in a semi-automated fashion. First, the method gathers event statistics such as event counts, individual probabilities, join event counts, conditional probabilities and join results for the observed correlations. Next, the method uses the different spatial granularity to retrieve events from other data sources only for the join time-intervals. For example, if a strong correlation between IP link downs and Synchronous Optical NETwork (SONET) protection switching events is identified on the same link (which should not be there from the domain knowledge), then the method extracts all events on either ends of the link for the time-intervals over which IP link down events and SONET protection switch events joined. This may provide more insight into the possible root causes at either ends of the link.

In one embodiment, the current method provides a correlation margin for event modeling. For example, the duration of different network events may vary across different types of events and monitoring devices. For example, SNMP measurements (e.g., CPU and traffic statistics) may be taken across fixed time intervals (e.g., five minutes), router reboots may take up to 15 minutes to complete. However, the moment a link fails, it is captured at a specific time. That is, the moment a routing re-convergence is initiated is captured with negligible delay. Thus, the correlation needs to have models for accurately incorporating event durations within the correlations. Note that, these event durations are often not defined in the data sources themselves, and have to be inferred using domain knowledge. In addition, the correlation margin may be used to handle discrepancies in timestamps. For example, there may be different event propagation times and collection times across the network. The current method uses a correlation margin of a pre-defined duration (e.g., 30 seconds) either side of the event when identifying joins between two events from different time series.

Figure 3:
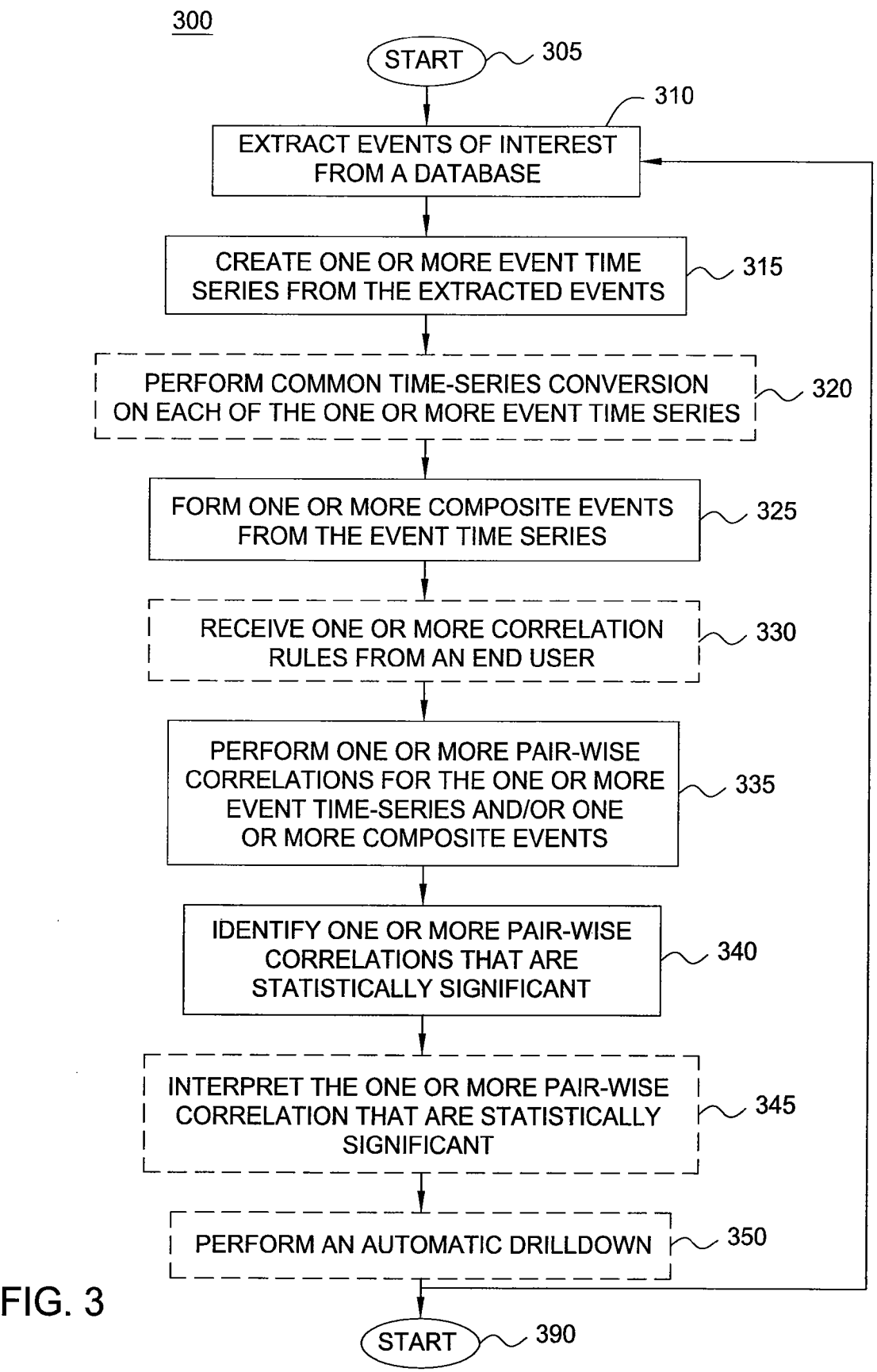
FIG. 3 illustrates a flowchart of a method for providing event correlation.

FIG. 3 illustrates a flowchart of a method 300 for providing event correlation in a network. For example, one or more steps of method 300 can be implemented by an application server. Method 300 starts in step 305 and proceeds to step 310.

In step 310, method 300 extracts events of interest from a database. For example, an application server may extract events of interest from a network-wide database and may identify each event by using a type of event, a timestamp and a location of the event.

In step 315, method 300 creates one or more event time series from the extracted events, wherein an event time series comprises a set of events of the same type and location that occur within a given time period, e.g., specified by a beginning time and an ending time for the event time series.

In optional step 320, method 300 may perform common time-series conversion on each of the one or more event time series. For example, the data for the extracted events may have originated from various sources with different time conventions, e.g., time-zones. The event time series data may then be processed for common time-series conversion for ease of use by a correlation engine.

In step 325, method 300 forms one or more composite events from the event time series. For example, the method may aggregate events over e.g., event types, time or space.

In optional step 330, method 300 receives and applies one or more correlation rules from an end user. In one example, a correlation engine may receive from an end user a rule to perform I:N, M:N, and/or $N^2$ pair-wise correlations. In one example, a correlation engine may receive a rule to include or exclude certain spatial components, e.g., do not correlate outside of a specific region. In one example, a correlation engine may receive a rule to identify correlations that exceed a predetermined significance level. Alternatively, one or more correlation rules may have been previously stored and method 300 simply retrieves and applies these one or more correlation rules from a storage device.

In step 335, method 300 performs one or more pair-wise correlations for the event time-series and/or composite events. For example, the method may correlate end-to-end path loss events with link loss events.

In step 340, method 300 identifies one or more pair-wise correlations that are statistically significant. For example, a user may specify confidence intervals for determining statistical significance of correlations. The method then identifies the pair-wise correlations that are significant in accordance with the confidence interval.

In optional step 345, method 300 interprets the one or more pair-wise correlations that are statistically significant. In one example, the method may identify a common cause for statistically correlated events. In one example, the method may determine that one or more rules provided by an end user are violated.

In optional step 350, method 300 performs an automatic drill-down wherein the automatic drill-down comprises performing multiple layers of analysis. For example, the method may perform 3 layers of analysis, wherein the first layer analysis is the highest level analysis, the second layer analysis is a more detailed level analysis than the first, and the third layer analysis is the most detailed analysis as discussed above. The method then ends in step 390 or returns to step 310 to continue extracting events of interest.

It should be noted that although not specifically specified, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
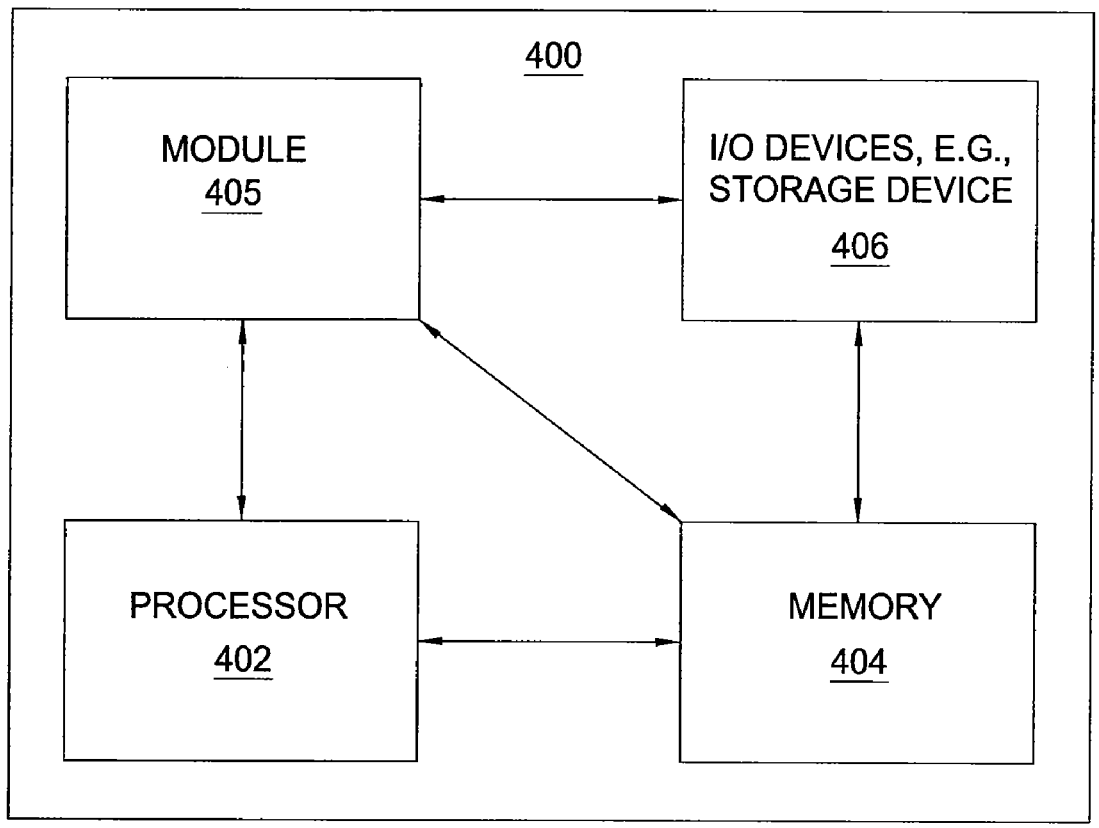
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing event correlation in a network, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing event correlation in a network can be loaded into memory 404 and executed by processor 402 to implement the functions as discussed above. As such, the present method 405 for providing event correlation in a network (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing event correlation in a network, comprising:
   extracting a plurality of events of interest from a database;
   creating an event time series from the plurality of events of interest, wherein the event time series comprises a set of events of a same type and of a same location that occur within a given time period;
   forming a composite event from the event time series;
   performing a pair-wise correlation for the event time-series or the composite event;
   identifying a pair-wise correlation that is statistically significant; and
   performing a common time-series conversion on the event time series, wherein the performing the common time-series conversion results in a binary time-series, wherein the binary time-series has a first value to represent a time-window over which an event occurred and a second value to represent a time-window over which the event did not occur.

2. The method of claim 1, further comprising:
   applying a correlation rule.

3. The method of claim 2, wherein the correlation rule comprises an expectation parameter, wherein the expectation parameter specifies whether a correlation is significant, wherein the expectation parameter comprises a spatial relationship.

4. The method of claim 1, further comprising:
   performing an automatic drill-down on the pair-wise correlation that is statistically significant, wherein the automatic drill-down comprises performing a multi-layer analysis.

5. The method of claim 1, wherein the performing the pair-wise correlation accepts input in a binary format or a non-binary format.

6. The method of claim 1, wherein the forming the composite event is performed by aggregating over an event type.

7. The method of claim 1, wherein the forming the composite event is performed by aggregating over a time.

8. The method of claim 1, wherein the forming the composite event is performed by aggregating over a space.

9. A method for providing event correlation in a network, comprising:
   extracting a plurality of events of interest from a database;
   creating an event time series from the plurality of events of interest, wherein the event time series comprises a set of events of a same type and of a same location that occur within a given time period;
   forming a composite event from the event time series;
   performing a pair-wise correlation for the event time-series or the composite event; and
   identifying a pair-wise correlation that is statistically significant, wherein the pair-wise correlation is performed by computing a standard Pearson's product-moment correlation coefficient.

10. A method for providing event correlation in a network, comprising:
    extracting a plurality of events of interest from a database;
    creating an event time series from the plurality of events of interest, wherein the event time series comprises a set of events of a same type and of a same location that occur within a given time period;
    forming a composite event from the event time series;
    performing a pair-wise correlation for the event time-series or the composite event; and
    identifying a pair-wise correlation that is statistically significant, wherein the identifying the pair-wise correlation that is statistically significant is performed by computing a confidence interval using Fisher's z-transforms.

11. A method for providing event correlation in a network, comprising:
    extracting a plurality of events of interest from a database;
    creating an event time series from the plurality of events of interest, wherein the event time series comprises a set of events of a same type and of a same location that occur within a given time period;
    forming a composite event from the event time series;
    performing a pair-wise correlation for the event time-series or the composite event; and
    identifying a pair-wise correlation that is statistically significant, wherein the identifying the pair-wise correlation that is statistically significant is performed by using a significance test that takes accounts for autocorrelation, wherein the significance test comprises a circular permutation test that generates samples using circular permutations and uses the samples to estimate a standard deviation.

12. A method for providing event correlation in a network, comprising:
    extracting a plurality of events of interest from a database;
    creating an event time series from the plurality of events of interest, wherein the event time series comprises a set of events of a same type and of a same location that occur within a given time period;
    forming a composite event from the event time series;
    performing a pair-wise correlation for the event time-series or the composite event; and
    identifying a pair-wise correlation that is statistically significant, wherein the identifying the pair-wise correlation that is statistically significant is performed by using a significance test that takes accounts for autocorrelation, wherein the significance test computes a standard deviation by replacing a sample size by an effective sample size.

13. A non-transitory computer-readable medium having stored thereon a plurality of instructions, the plurality of instructions including instructions which, when executed by a processor, cause the processor to perform a method for providing event correlation in a network, comprising:
    extracting a plurality of events of interest from a database;
    creating an event time series from the plurality of events of interest, wherein the event time series comprises a set of events of a same type and of a same location that occur within a given time period;
    forming a composite event from the event time series;

performing a pair-wise correlation for the event time-series or the composite event;

identifying a pair-wise correlation that is statistically significant; and performing a common time-series conversion on the event time series, wherein the performing the common time-series conversion results in a binary time-series, wherein the binary time-series has a first value to represent a time-window over which an event occurred and a second value to represent a time-window over which the event did not occur.

14. The non-transitory computer-readable medium of claim 13, further comprising:

applying a correlation rule.

15. The non-transitory computer-readable medium of claim 14, wherein the correlation rule comprises an expectation parameter, wherein the expectation parameter specifies whether a correlation is significant, wherein the expectation parameter comprises a spatial relationship.

16. A non-transitory computer-readable medium having stored thereon a plurality of instructions, the plurality of instructions including instructions which, when executed by a processor, cause the processor to perform a method for providing event correlation in a network, comprising:

extracting a plurality of events of interest from a database;

creating an event time series from the plurality of events of interest, wherein the event time series comprises a set of events of a same type and of a same location that occur within a given time period;

forming a composite event from the event time series;

performing a pair-wise correlation for the event time-series or the composite event; and identifying a pair-wise correlation that is statistically significant, wherein the pair-wise correlation is performed by computing a standard Pearson's product-moment correlation coefficient.

17. An apparatus for providing event correlation in a network, comprising:

means for extracting a plurality of events of interest from a database;

means for creating an event time series from the plurality of events of interest, wherein the event time series comprises a set of events of a same type and of a same location that occur within a given time period;

means for forming a composite event from the event time series;

means for performing a pair-wise correlation for the event time-series or the composite event;

means for identifying a pair-wise correlation that is statistically significant; and means for performing a common time-series conversion on the event time series, wherein the performing the common time-series conversion results in a binary time-series, wherein the binary time-series has a first value to represent a time-window over which an event occurred and a second value to represent a time-window over which the event did not occur.

* * * * *